United States Patent
Nishiyama et al.

(10) Patent No.: US 11,854,239 B2
(45) Date of Patent: Dec. 26, 2023

(54) IMAGE PROCESSING DEVICE, IMAGING DEVICE, IMAGE PROCESSING METHOD, AND RECORDING MEDIUM

(71) Applicant: CANON KABUSHIKI KAISHA, Tokyo (JP)

(72) Inventors: Tomohiro Nishiyama, Tokyo (JP); Keisuke Midorikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 45 days.

(21) Appl. No.: 17/565,289

(22) Filed: Dec. 29, 2021

(65) Prior Publication Data

US 2022/0215643 A1    Jul. 7, 2022

(30) Foreign Application Priority Data

Jan. 7, 2021   (JP) .................. 2021-001324
Apr. 30, 2021  (JP) .................. 2021-077028

(51) Int. Cl.
*G06V 10/26*   (2022.01)
*G06T 7/194*   (2017.01)
*G06V 10/36*   (2022.01)
*G06V 10/88*   (2022.01)

(52) U.S. Cl.
CPC .............. *G06V 10/26* (2022.01); *G06T 7/194* (2017.01); *G06V 10/36* (2022.01); *G06V 10/88* (2022.01); *G06V 2201/07* (2022.01)

(58) Field of Classification Search
CPC ...... G06V 40/161; G06V 40/20; G06V 10/25; G06V 10/10; G06V 20/693; G06V 20/00; G06V 40/16; G06V 40/162; G06V 10/26; G06V 10/36; G06V 10/88; G06V 2201/07; G06V 10/30; G06T 1/0007; G06T 7/00; G06T 7/194
See application file for complete search history.

(56) References Cited

U.S. PATENT DOCUMENTS

| | | | | |
|---|---|---|---|---|
| 8,031,941 | B2* | 10/2011 | Suino | G06V 30/162 |
| | | | | 358/1.9 |
| 9,953,437 | B1* | 4/2018 | Kim | G06T 7/11 |
| 10,750,200 | B2* | 8/2020 | Wang | H04N 19/107 |
| 2010/0040356 | A1* | 2/2010 | Ishikawa | G03B 13/20 |
| | | | | 396/124 |

(Continued)

FOREIGN PATENT DOCUMENTS

| | | | | |
|---|---|---|---|---|
| CN | 110765858 A | * | 2/2020 | ......... G01R 31/1218 |
| CN | 111340837 A | * | 6/2020 | |

(Continued)

*Primary Examiner* — Nizar N Sivji
(74) *Attorney, Agent, or Firm* — Canon U.S.A., Inc. IP Division

(57) ABSTRACT

An imaging device acquires an input image using a lens unit and an imaging element and detects a subject. The imaging device calculates a reliability of detection of a subject and compares the reliability with a threshold value. When the reliability of detection of a subject is less than the threshold value, the imaging device performs a defocus calculating process and a background area determining process. The imaging device performs a low-pass filtering process on the determined background area, decreases a high-frequency component in the background area, and then detects a subject again.

18 Claims, 9 Drawing Sheets

(56) References Cited

U.S. PATENT DOCUMENTS

| | | | |
|---|---|---|---|
| 2014/0086507 A1* | 3/2014 | Lin | G06T 5/00 |
| | | | 382/274 |
| 2016/0224853 A1* | 8/2016 | Xiong | G06V 10/54 |
| 2016/0241776 A1* | 8/2016 | Kim | G06V 40/161 |
| 2018/0247148 A1* | 8/2018 | Saitou | G06T 7/11 |
| 2018/0278830 A1* | 9/2018 | Hamano | G03B 13/36 |
| 2019/0364201 A1* | 11/2019 | Hirai | H04N 9/643 |

FOREIGN PATENT DOCUMENTS

| | | | |
|---|---|---|---|
| CN | 112102222 A | * | 12/2020 |
| JP | 6358552 B2 | | 7/2018 |
| JP | 2019186911 A | * | 10/2019 |
| JP | 2019186911 A | | 10/2019 |

\* cited by examiner

IMAGE PROCESSING DEVICE, IMAGING DEVICE, IMAGE PROCESSING METHOD, AND RECORDING MEDIUM

BACKGROUND OF THE DISCLOSURE

Field of the Disclosure

The present disclosure relates to a subject detection technique in an image processing device.

Description of the Related Art

When a subject in a captured image is detected in an imaging device, a process of extracting an image area of the subject (a subject area) is performed. When a subject area is extracted, there is a likelihood that the subject will not be able to be detected if a subject or a background other than a detection target has a texture pattern similar to a detected subject or a complex texture pattern. Japanese Unexamined Patent Application Publication No. 2019-186911 discloses a subject detection technique according to blur or sharpness of a main subject. By selecting parameters of a detection unit and detecting a subject according to the blur or sharpness of the subject, the subject can be accurately detected, for example, even in a state in which the subject is out of focus. Japanese Patent No. 6358552 discloses a technique of excluding an area in which a subject to be detected is not likely to be present and detecting the subject using a distance map. With this configuration, it is possible to decrease a likelihood that another subject or a background will be present in an area to be detected.

In the technique disclosed in Japanese Unexamined Patent Application Publication No. 2019-186911, when a subject to be detected is in focus and an image of the background has a complex pattern, there is a likelihood that desired detection accuracy will not be able to be obtained in detection of the subject. In the technique disclosed in Japanese Patent No. 6358552, an unnatural edge may be generated by cutting a subject area out and there is a likelihood of a decrease in accuracy in detection of a subject using a convolutional neural network.

SUMMARY OF THE DISCLOSURE

The present disclosure provides an image processing device that can reduce an influence of texture of a subject other than a detection target or a background on detection of a subject and more accurately detect a subject.

According to an embodiment of the present disclosure, there is provided an image processing device including at least one processor and at least one memory holding a program that makes the processor function as: an acquisition unit configured to acquire an image captured by an imaging unit; a detection unit configured to detect a subject from the acquired image; and a control unit configured to determine a subject detection result from the detection unit and perform control such that frequency components or pixel values of an overall or partial area of the image are adjusted, wherein the detection unit detects a subject from an image in which the frequency components or the pixel values have been adjusted.

Further features of the present disclosure will become apparent from the following description of exemplary embodiments with reference to the attached drawings.

DESCRIPTION OF THE EMBODIMENTS

Hereinafter, embodiments of the present disclosure will be described in detail with reference to the accompanying drawings. In each embodiment, an example of an imaging device to which an image processing device according to the present disclosure is applied will be described.

First Embodiment

Figure 1:
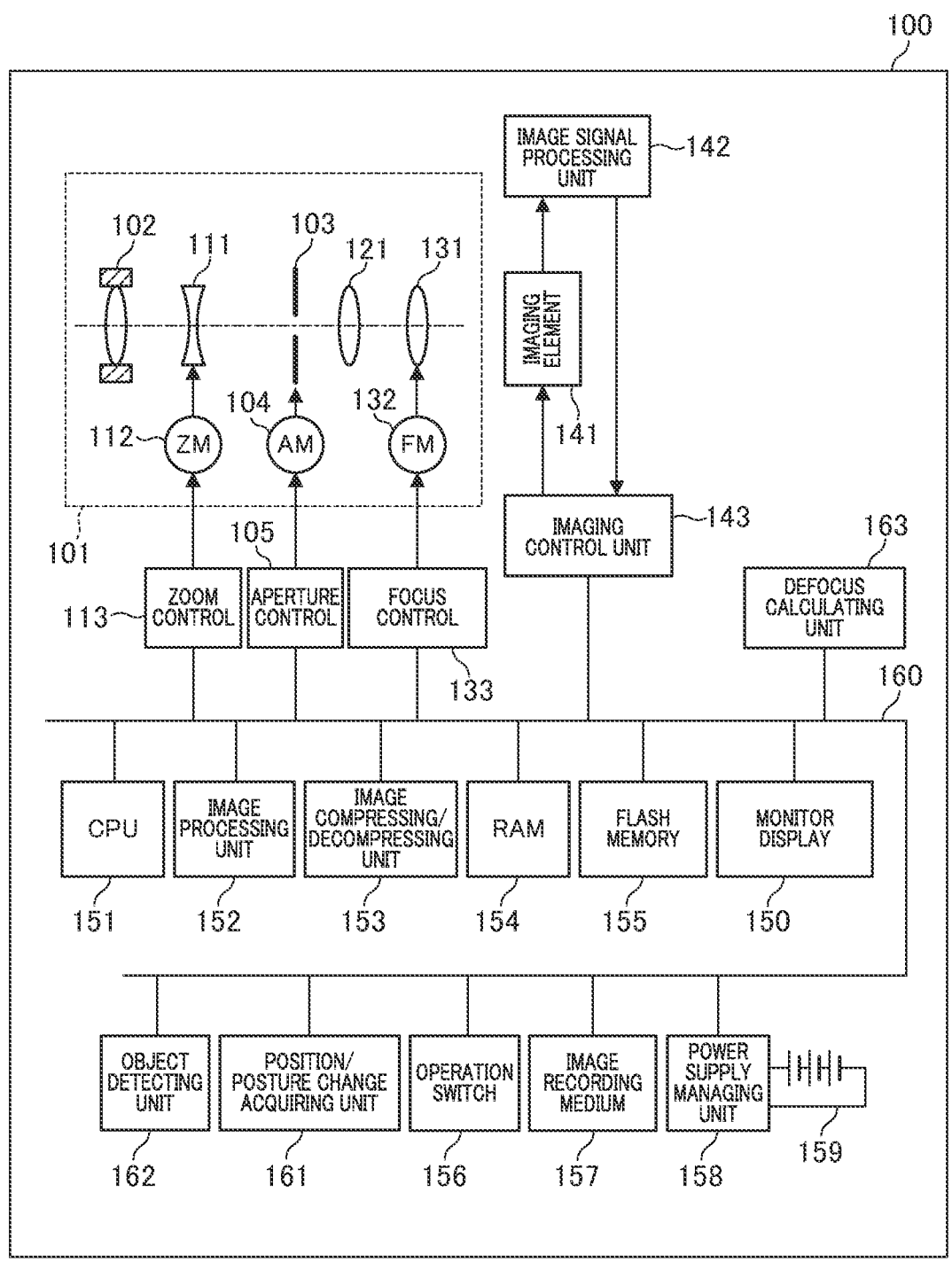
FIG. 1 is a block diagram illustrating a configuration of an imaging device according to an embodiment.

A configuration of an imaging device according to a first embodiment will be described below with reference to FIG. 1. FIG. 1 is a block diagram illustrating an example of a configuration of an imaging device 100. The imaging device 100 is a digital still camera, a video camera, or the like that can image a subject and record data of a moving image or a still image on various media such as a tape, a solid-state memory, an optical disc, or magnetic disk. The present disclosure can be applied to various electronic devices including an imaging unit.

Constituent units in the imaging device 100 are connected to each other via a bus 160. The constituent units are controlled by a central processing unit (CPU) 151 constituting a control unit. The CPU 151 performs the following processes or control by executing a program.

A lens unit 101 includes optical members such as fixed lenses and movable lenses constituting an imaging optical system. In FIG. 1, a configuration including a first fixed lens group 102, a zoom lens (variable power lens) 111, an aperture 103, a third fixed lens group 121, and a focusing lens (focus adjustment lens) 131 is illustrated.

An aperture control unit 105 adjusts an aperture diameter of the aperture 103 and controls adjustment of an amount of light at the time of imaging by driving the aperture 103 using an aperture motor (AM) 104 in accordance with a command from the CPU 151. A zoom control unit 113 changes a focal distance of the imaging optical system by driving the zoom lens 111 using a zoom motor (ZM) 112.

A focus control unit 133 determines an amount of drive of a focus motor (FM) 132 based on an out-of-focus value (a defocus value) on an optical axis in focus adjustment of the lens unit 101. The focus control unit 133 controls a focus adjustment state by driving the focusing lens 131 using a focus motor (FM) 132 based on the determined amount of drive. Movement control of the focusing lens 131 is performed by the focus control unit 133 and the focus motor (FM) 132, whereby automatic focus (AF) control is realized.

The focusing lens 131 is simply illustrated as a single lens in FIG. 1, but the focusing lens generally includes a plurality of lenses.

Light from a subject forms an image on an imaging element 141 via the lens unit 101. The imaging element 141 performs photoelectric conversion on a subject image (an optical image) formed by the imaging optical system and outputs an electrical signal. The imaging element 141 has a configuration in which photoelectric conversion portions corresponding to a predetermined number of pixels are arranged in a lateral direction and a longitudinal direction, and a light receiving portion performs photoelectric conversion and outputs an electrical signal corresponding to an optical image to an imaging signal processing unit 142. The imaging element 141 is controlled by an imaging control unit 143.

The imaging signal processing unit 142 performs signal processing of putting a signal acquired by the imaging element 141 in order as an image signal and acquiring image data on an imaging surface. Image data output from the imaging signal processing unit 142 is sent to the imaging control unit 143 and is temporarily stored in a random access memory (RAM) 154.

An image compressing/decompressing unit 153 reads and compresses image data stored in the RAM 154 and then performs a process of recording the image data on an image recording medium 157. In parallel with this process, the image data stored in the RAM 154 is sent to an image processing unit 152.

The image processing unit 152 performs predetermined image processing such as a process of reducing or enlarging image data to an optimal size, a process of calculating similarity between image data, or a gamma correction and white balance process based on a subject area. The image data processed to an optimal size is appropriately sent to a monitor display 150 to display an image and preview image display or through-image display is performed. An object detection result performed by an object detecting unit 162 may be displayed to overlap the image data. The object detecting unit 162 performs a process of determining an area in which a predetermined object is present in a captured image using an image signal.

Data of a plurality of images captured in a predetermined period of time or various types of detection data can be buffered using the RAM 154 as a ring buffer. The various types of detection data include a detection result from the object detecting unit 162 for each piece of image data and data of a position/posture change of the imaging device 100.

A position/posture change acquiring unit 161 includes, for example, a position/posture sensor such as a gyro sensor, an acceleration sensor, or an electronic compass, and measures a position/posture change in an imaging scene of the imaging device 100. The acquired data of the position/posture change is stored in the RAM 154.

An operation switch unit 156 is an input interface unit including a touch panel or operation buttons. A user can instruct various operations by selecting or operating various functional icons which are displayed on the monitor display 150. The CPU 151 controls an imaging operation based on an operation instruction signal input from the operation switch unit 156 or the magnitude of a pixel signal of image data temporarily stored in the RAM 154. For example, the CPU 151 determines a storage time of the imaging element 141 or a set gain value at the time of output from the imaging element 141 to the imaging signal processing unit 142. The imaging control unit 143 receives an instruction for the storage time and the set gain value from the CPU 151 and controls the imaging element 141.

The CPU 151 transmits a command to the focus control unit 133 to perform AF control on a specific subject area, and transmits a command to the aperture control unit 105 to perform exposure control using luminance values of the specific subject area.

The monitor display 150 includes a display device and performs display of an image, rectangular display of an object detection result, or the like. A power supply managing unit 158 manages a battery 159 and performs stable supply of electric power to the whole imaging device 100.

A control program required for operation of the imaging device 100, parameters used for operations of the constituent units, and the like are stored in a flash memory 155. When a power supply is switched from an OFF state to an ON state by a user's operation and the imaging device 100 is started, the control program and the parameters stored in the flash memory 155 are read into a part of the RAM 154. The CPU 151 controls the operation of the imaging device 100 based on the control program and constants loaded to the RAM 154.

A defocus calculating unit 163 calculates a defocus value for an arbitrary subject in a captured image. A method of calculating a defocus value is known and thus description thereof will be omitted. The generated defocus information is stored in the RAM 154 and is referred to by the image processing unit 152. In this embodiment, an example in which distribution information of defocus values in a captured image is acquired is described, but another method can be used. For example, a method of pupil-splitting light from a subject to generate a plurality of viewpoint images (parallax images) and calculating an amount of parallax to acquire depth distribution information of the subject may be used. A pupil-split type imaging element includes a plurality of micro lenses and a plurality of photoelectric conversion portions corresponding to the micro lenses and can output signals of different viewpoint images from the photoelectric conversion portions. The depth distribution information of a subject includes data representing a distance from the imaging unit to the subject (a subject distance) as a distance value of an absolute value or data (such as distribution data of the amount of parallax) representing a relative distance relationship (a depth of an image) in image data. A direction of the depth is a depth direction with respect to the imaging unit. The plurality of pieces of viewpoint image data can also be acquired by a multocular camera including a plurality of imaging units.

In this embodiment, an example in which a convolutional neural network is used as a subject detecting unit based on machine learning is described. In this specification, "convolutional neural network" is abbreviated as "CNN." A CNN is constructed by piling up convolutional layers or pooling layers. The subject detecting unit outputs data of a rectangular area on an image and data of a reliability of a detection result. For example, a reliability is output as an integer value from 0 to 255 and a likelihood of error detection becomes higher as the value of the reliability becomes smaller. The CPU 151 realizes the following processes using data of a model trained for detection of a subject and a program.

In a subject detecting process using a CNN, a convolutional operation using a filter obtained by machine learning in advance is performed a plurality of times. Since the convolutional operation, that is, a product-sum operation using a pixel of interest and pixel values of a surrounding area thereof, is performed, an operation result corresponding to an area of a subject to be detected is also affected by a pixel pattern of a background area near the area based on characteristics thereof. A range of the background area affecting detection of a subject area depends on the size of a filter or the number of layers of a network.

In order to reduce an influence of a pixel pattern of the background area on detection of a subject, the CPU 151 performs a process of decreasing a high-frequency component of the background area. This process can be realized as follows.

(1) Predetermined image processing is performed on pixels in an area determined to be an area far from the imaging device 100 (background area) based on defocus information, depth information, distance information, and the like to blur an image. Examples of the predetermined processing include a low-pass filtering process and a band-pass filtering process which are performed by the image processing unit 152.

(2) When a desired subject is in focus to some extent, the aperture control unit 105 increases an amount of blur in the background area by performing control such that the aperture 103 of the lens unit 101 is driven in a direction in which an aperture diameter thereof increases.

(3) The focus control unit 133 increases a defocus value in the background area by driving the focusing lens 131 to change an in-focus position in a predetermined direction.

Alternatively, the process of decreasing a high-frequency component of the background area can be performed by combining a plurality of processes. The process of decreasing a high-frequency component of the background area which is described above in (1) to (3) is an example of a process of adjusting frequency components of an overall or partial area of an image. The CPU 151 performs control for enhancing accuracy of detection of a subject by determining a detection result of a subject and determining a method of the process of adjusting frequency components.

Figure 2:
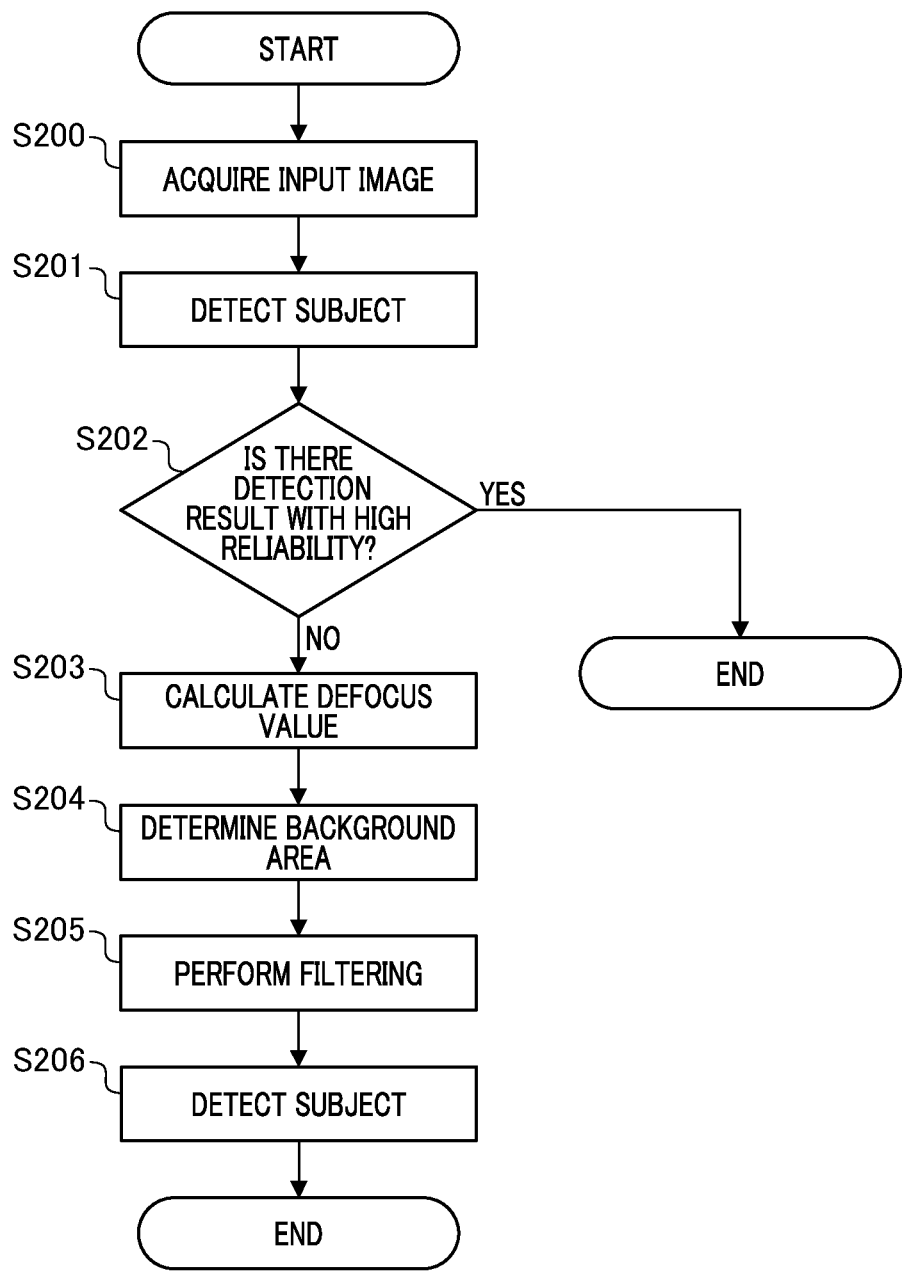
FIG. 2 is a flowchart illustrating a process routine according to a first embodiment.

A process routine in this embodiment will be described below with reference to FIG. 2. FIG. 2 is a flowchart illustrating an example of the process routine and the following processes are realized by causing the CPU 151 to execute a program and to control the constituent units in FIG. 2.

In S200, the imaging control unit 143 processes a signal acquired by the imaging element 141 and supplies input image data to the constituent units. Then, in S201, a subject is detected from an input image. A subject detecting process using a CNN is performed, and a process of outputting a rectangular area on a captured image and a reliability of a detection result is performed.

In S202, the CPU 151 determines whether a detection result with a high reliability has been acquired. When a certain subject is detected and it is determined that the reliability is equal to or higher than a predetermined threshold value, the process routine ends. In this case, an arbitrary process such as AF control or frame display is performed on the detected subject and then the process on the image of the subject ends. On the other hand, when it is determined that a detection result with a high reliability has not been acquired, the process routine proceeds to the process of S203.

In S203, the defocus calculating unit 163 calculates a defocus value of each image area and outputs defocus information. Then, in S204, the CPU 151 performs a background area determining process using the defocus information calculated in S203. Here it is assumed that an area in which the defocus value is equal to or greater than a threshold value is considered to be the background area.

In S205, the CPU 151 and the image processing unit 152 perform a low-pass filtering process on only the area considered to be the background area in S204. In S206, the CPU 151 performs the subject detecting process again. That is, the subject detecting process is performed on the image on which the low-pass filtering process has been performed. Thereafter, an arbitrary process such as AF control or frame display is performed based on the subject detection result and the process routine on an image of the detected subject ends.

Second Embodiment

Figure 3:
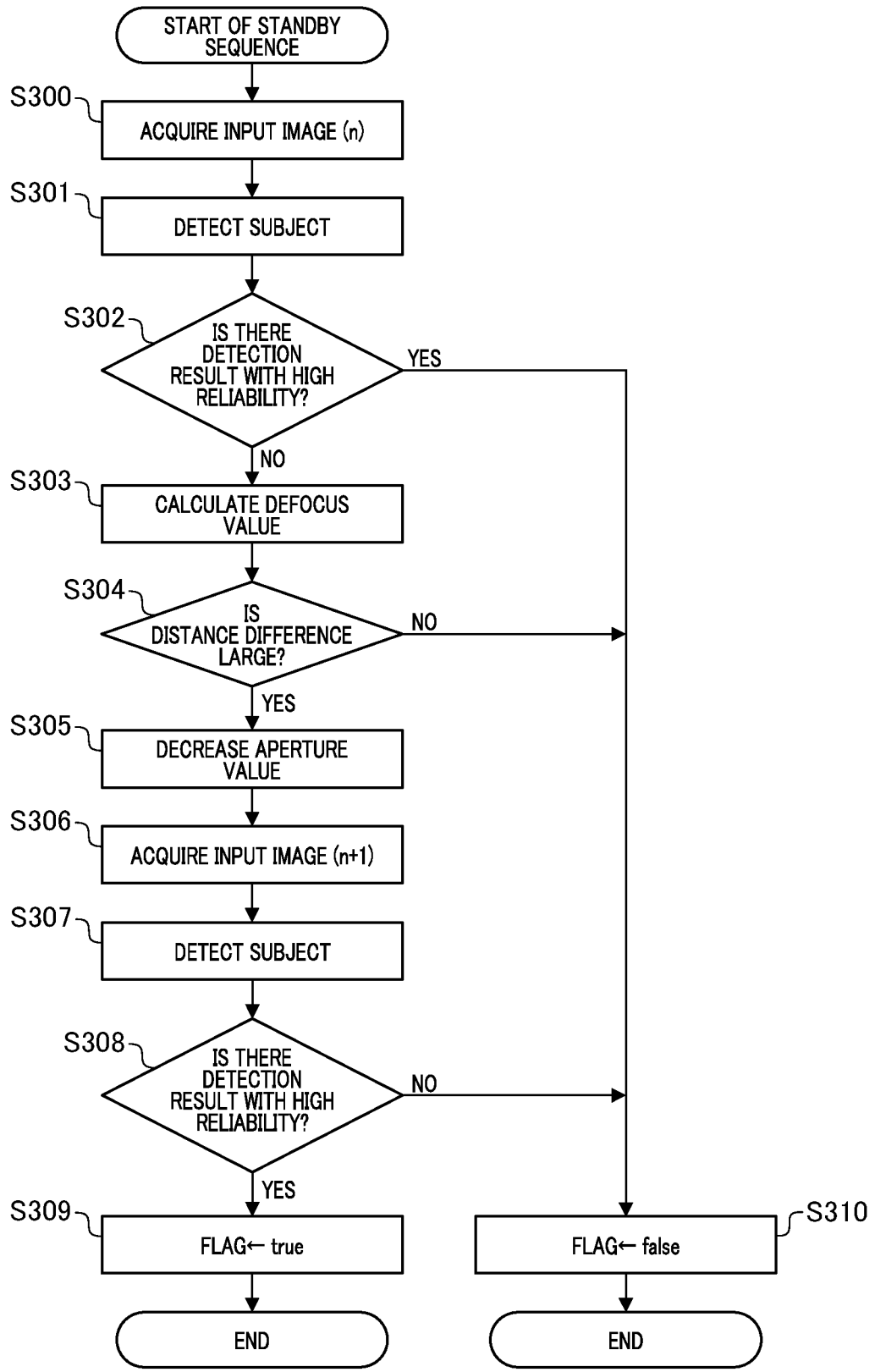
FIG. 3 is a flowchart illustrating a process routine in a standby state according to second and third embodiments.

A second embodiment of the present disclosure will be described below. In this embodiment, an example in which detection performance is improved by changing a method of blurring an image through adjustment of the aperture 103 will be described. FIG. 3 is a flowchart illustrating an example of a process routine in a standby state which is a stage in which a user adjusts the composition. The same elements as those in the first embodiment will be referred to by the same reference numerals or signs, detailed description thereof will be omitted, and differences therebetween will be mainly described. This omission of description is the same for the following embodiments.

A sequence in the standby state will be described below with reference to FIG. 3. In S300, the imaging control unit 143 acquires an n-th input image and supplies the acquired input image to the constituent units. Here, n is a variable of a natural number and an initial value thereof is set to 1. In S301, subject detection based on a CNN is performed on the n-th input image. In S302, the CPU 151 determines whether a detection result with a high reliability has been acquired. When the reliability is equal to or higher than a threshold value, a process such as AF control or frame display is performed on a detected subject, the process on the subject image ends, and then the process routine proceeds to the process of S310. When it is determined in S302 that the reliability is lower than the threshold value, the process routine proceeds to the process of S303.

In S303, a defocus calculating process is performed, and the defocus calculating unit 163 supplies defocus information to the constituent units. In S304, the CPU 151 calculates a difference value between a maximum value and a minimum value of a defocus value of an image as a whole. This difference value is used to evaluate whether a distance difference in a depth direction is present in an imaging scene. When the calculated difference value is less than a threshold value, the process routine proceeds to the process of S310. When the difference value is equal to or greater than the threshold value, the process routine proceeds to the process of S305. In either case, the process routine on the image ends.

In S305, the CPU 151 performs a process of setting an aperture value to a smaller value. For example, a process of setting the aperture value to a value which is one step less than a current aperture value is performed. Alternatively, a minimum aperture value which can be set in the imaging device 100 may be set.

In S306, the imaging control unit 143 acquires a next frame, that is, an (n+1)-th input image. Then, in S307, subject detection based on a CNN is performed on the (n+1)-th input image. In S308, the CPU 151 determines whether a detection result with a high reliability has been acquired. When the reliability is equal to or higher than a threshold value, a process such as AF control or frame display is performed on a detected subject, the process on a subject image ends, and then the process routine proceeds to the process of S309. When it is determined that the reliability is lower than the threshold value, the process routine proceeds to the process of S310.

In S309 and S310, the CPU 151 performs a flag setting process. A value of the flag is set to a true value when it represents that blurring of a background area in an imaging scene is advantageous for detecting a subject in an input image, and is set to a false value when it represents that the blurring is not advantageous for the subject in the input image. Setting for validating the flag, that is, setting of a true value, is performed in S309. Setting for invalidating the flag, that is, setting of a false value, is performed in S310. After S309 and S310, the series of processes ends.

Figure 4:
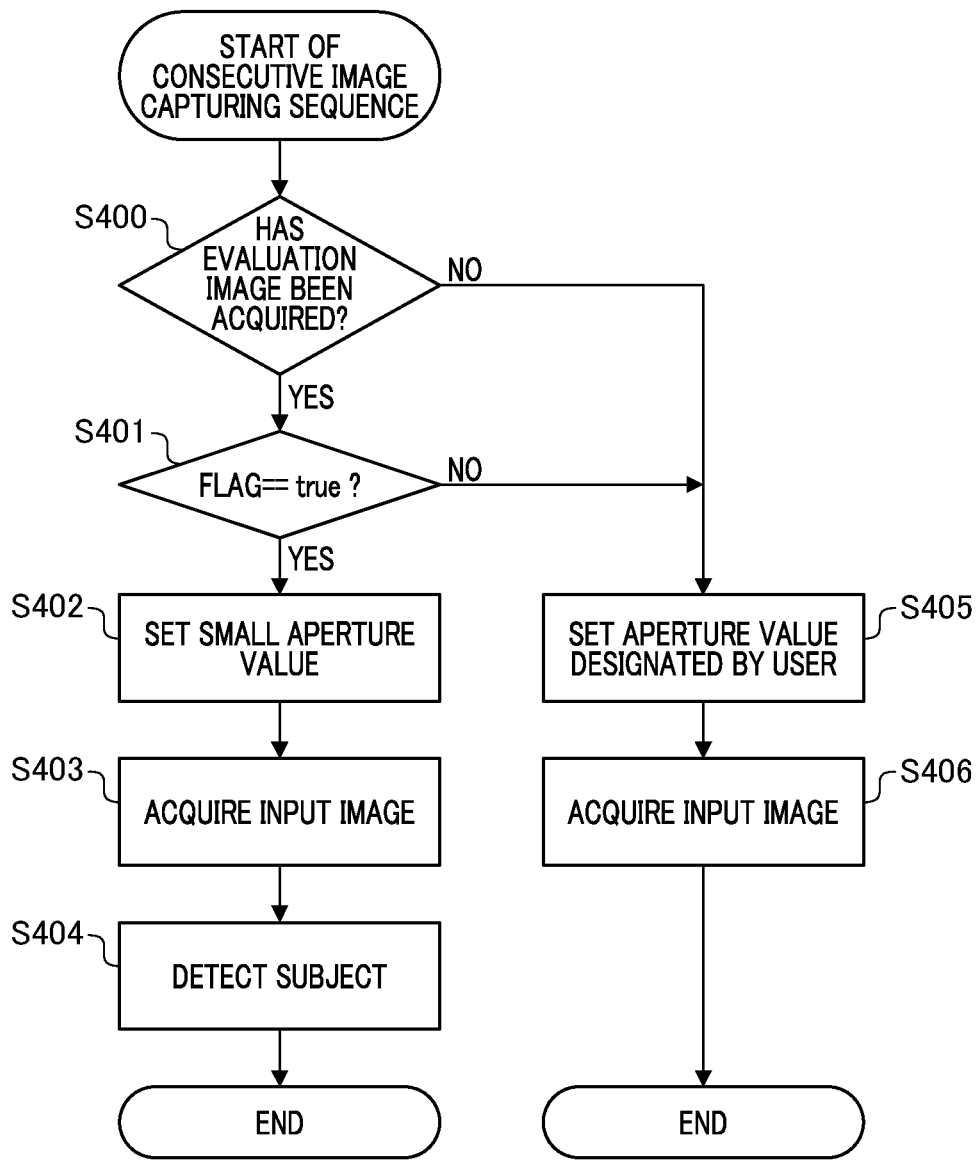
FIG. 4 is a flowchart illustrating a process routine in a consecutive still image capturing state according to the embodiment.

A process routine in a consecutive still image capturing state will be described below with reference to FIG. 4. FIG. 4 is a flowchart illustrating an example of a sequence in a consecutive still image capturing state. In a consecutive still image capturing state, it is assumed that a first frame for acquiring image (still image) data which is actually output to a recording medium and a second frame for acquiring evaluation image data which is used for image processing in the imaging device are alternately repeated. It is assumed that subject detection, AF control and frame display on a detection result, or the like are performed only on an evaluation image.

In S400, the CPU 151 determines whether a target frame is the second frame and evaluation image data has been acquired. When it is determined that evaluation image data has been acquired, the process routine proceeds to the process of S401. When it is determined that recording still image data has been acquired in the first frame, the process routine proceeds to the process of S405.

In S401, the CPU 151 performs a process of determining the flag set in S309 and S310 (FIG. 3). When it is determined that the flag is valid (true), the process routine proceeds to the process of S402. When it is determined that the flag is invalid (false), the process routine proceeds to the process of S405.

In S402, the CPU 151 sets a small aperture value similarly to S305 in FIG. 3. Thereafter, input image data is acquired in S403 and then subject detection based on a CNN is performed in S404. When a certain subject is detected and it is determined that a reliability is equal to or higher than a threshold value, the process such as AF control or frame display is performed on the subject and the process routine for the input image ends. In S405, the CPU 151 sets the aperture value as designated by a user. Then, in S406, input image data is acquired and the process routine on the input image ends.

In this embodiment, it is determined whether a distance difference in the depth direction is present based on the defocus information in S304 in FIG. 3, and adjustment of the aperture value is performed based on the determination result. When it is determined in S401 in FIG. 4 that the flag is valid, for example, an aperture value which differs between an evaluation image and a recording still image is set and an input image is acquired. At this time, the CPU 151 determines a period of time required for opening/closing the aperture and sets an upper limit of a consecutive image capturing speed. By changing the method of blurring an image through adjustment of the aperture 103, it is possible to improve detection performance.

Third Embodiment

A third embodiment of the present disclosure will be described below with reference to FIGS. 3 and 4. In this embodiment, a configuration for controlling whether an aperture value is to be decreased using information of a degree of deviation of subject detection results for each frame is described. For example, it is assumed that subject detection be performed on two consecutive frames. When a subject detection result with a reliability equal to or higher than a predetermined threshold value is acquired in any frame, the CPU 151 performs the same control as in the aforementioned embodiment.

The CPU 151 calculates a difference value in reliability between the subject detection results for the two consecutive frames and compares the difference value with a predetermined difference threshold value. When the difference value in reliability is equal to or greater than the difference threshold value, the CPU 151 determines that a deviation occurs between the detection results. At this time, the CPU 151 calculates the difference value by setting the value of reliability for a frame in which a subject has not been detected to zero.

When it is determined that a deviation occurs between the subject detection results, the CPU 151 determines that an influence of a background pattern in an imaging scene on the performance of the subject detecting unit can be reduced by decreasing the aperture value to blur the background image. In this case, the CPU 151 sets the flag to be valid in S309 in FIG. 3 and performs the consecutive image capturing sequence of S400 to S406 of FIG. 4.

An application example to an imaging device that can perform focus/defocus control for each area like a light-field camera will be described below. The light-field camera can concentrate a focus on a desired area or position by splitting incident light and acquiring intensity information and incidence direction information of light using a micro lens array which is arranged in the imaging element.

For example, an imaging scene when a certain difference in depth is present in a subject area to be detected is considered. In such an imaging scene, a subject may not be detected because the overall subject area is not in focus. Alternatively, a main subject may not be detected because the main subject is out of focus and an image of the overall main subject is slightly blurred. In this case, the CPU 151 determines that the subject is more likely to be detected by focus (focusing) control on only an area in which the defocus value is in a predetermined range. The reason the detection area is limited to the area in which the defocus value is in the predetermined range is that there is a likelihood that the subject will not be detected as a result when a background has a complex pattern and focus control is performed together on the background area. The CPU 151 considers an area in which the defocus value is equal to or greater than a threshold value as the background area and does not perform any process on the area or performs control such that the defocus value increases.

The process routine according to this embodiment is performed regardless of an evaluation image or a recording still image or is performed on an evaluation image similarly to FIG. 4 and is not performed on a recording still image.

An example of an imaging device having an imaging mode in which an aperture value is automatically determined will be described below. In such an imaging mode, the CPU 151 determines the aperture value (temporary value) using an existing method. At this time, as described above in S300 to S310 in FIG. 3, the CPU 151 determines whether the subject detection performance is enhanced when the aperture value (temporary value) is decreased. When it is determined that the subject detection performance is further enhanced, the CPU 151 performs a process of further decreasing the aperture value and adjusts a set value such as a shutter speed therewith. Similarly to S304 in FIG. 3, the CPU 151 determines a distance difference in the depth direction in the captured image. When there is a distance difference equal to or greater than a threshold value (or when a difference value between a maximum value and a minimum value of the defocus value in the whole image is equal to or greater than a difference threshold value), the CPU 151 repeatedly performs a process of further decreasing the aperture value (temporary value) by one step and determines a final aperture value.

According to this embodiment, in a scene in which a complex background pattern is included, it is possible to provide an imaging device that can decrease an influence of the complex background pattern on subject detection and detect a subject with higher accuracy. The subject detecting process based on machine learning described above in the embodiment is an example. The present disclosure is not limited to a trained model for subject detection, and various subject detecting processes capable of calculating a reliability of subject detection (such as a reliability of a correlation operation in phase difference detection) from the defocus value or an amount of image shift of a plurality of viewpoint images can be employed.

Fourth Embodiment

A fourth embodiment of the present disclosure will be described below with reference to FIGS. 5 to 8. In this embodiment, an area in which a subject is present is defined using a defocus map (or a distance map) in which defocus values (or distance values) are stored for pixels. It is possible to much reduce erroneous detection due to a texture pattern similar to a subject or a complex texture pattern and to improve detection accuracy using a shape profile of a subject together. At that time, a process of cutting out an area including a detection target and then smoothing the vicinity of an area boundary or a process of gradually decreasing pixel values in an area other than a detection target is performed. Accordingly, it is possible to curb generation of an unnatural edge which causes a decrease in accuracy of a CNN.

Figure 5:
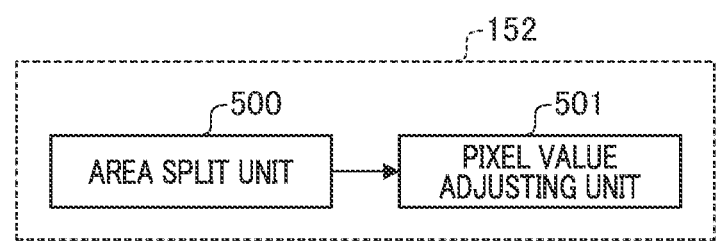
FIG. 5 is a block diagram illustrating a configuration of an image processing unit 152.
Figure 6:
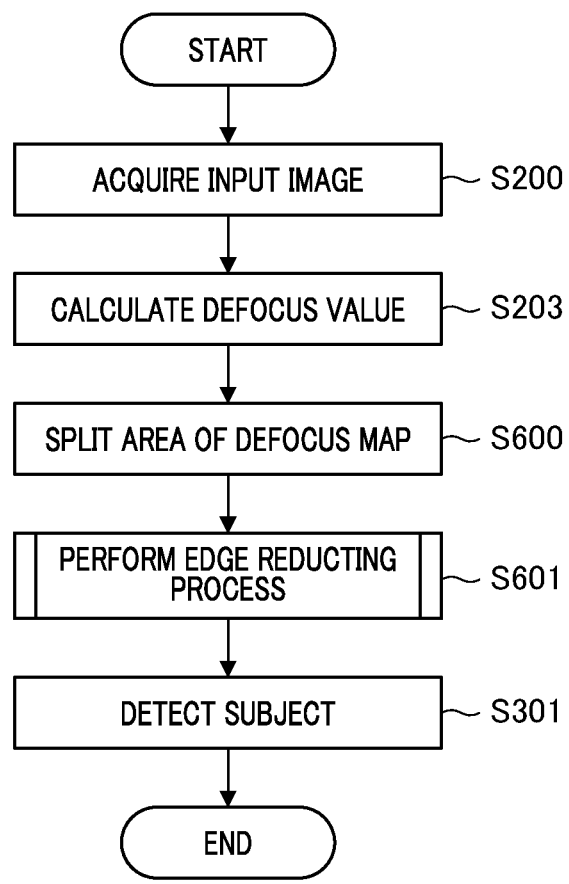
FIG. 6 is a flowchart illustrating a process routine according to a fourth embodiment.

FIG. 5 is a block diagram illustrating a part of the configuration of the image processing unit 152. The image processing unit 152 includes an area split unit 500 and a pixel value adjusting unit 501. FIG. 6 is a flowchart illustrating an example of a process routine. The following process routine is realized by causing the CPU 151 to control the constituent units illustrated in FIG. 5 by executing a program. The processes of S200 and S203 are the same as described above with reference to FIG. 2 and the process of S301 is the same as described above with reference to FIG. 3. After S203, the process routine proceeds to the process of S600.

In S600, the area split unit 500 splits an area of an input image using a defocus map. Here, it is assumed that the splitting is performed based on a distribution histogram of defocus values, but an existing clustering or area split method such as a k-means method or a super-pixel method may be used.

In S601, the pixel value adjusting unit 501 performs an edge reducing process. The pixel value adjusting unit 501 performs a low-pass filtering process or multiplication of a weighting factor on an input image based on information on split areas in S600 and curbs generation of an edge.

Figure 7:
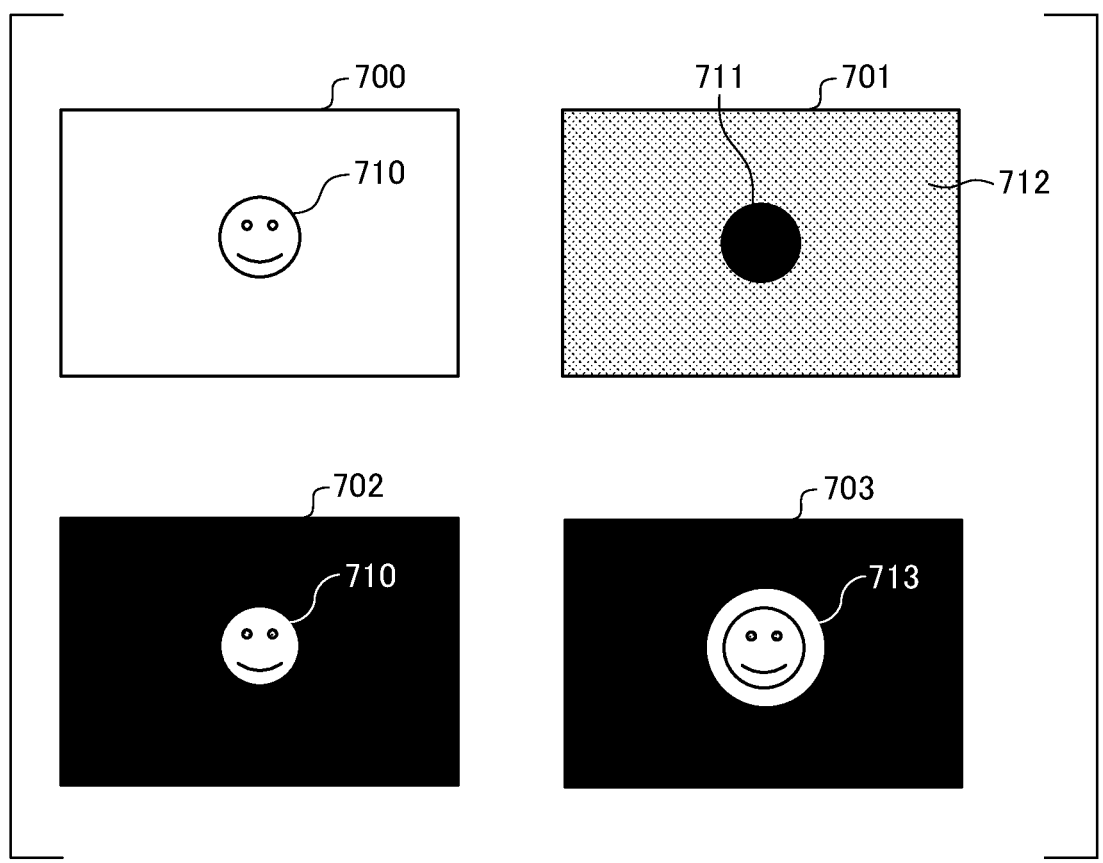
FIG. 7 is a conceptual diagram schematically illustrating the process routine according to the fourth embodiment.

Details of the processes which are performed by the area split unit 500 and the pixel value adjusting unit 501 will be described below with reference to a conceptual diagram of FIG. 7 and a flowchart of FIG. 8. In the following description, it is assumed that a low-pass filtering process is performed in S601 in FIG. 6. FIG. 7 illustrates a captured image 700 and a defocus map 701 in which a defocus value is stored for each pixel. An example in which a subject 710 appears in the captured image 700 is illustrated. The number of pixels of the captured image 700 and the number of pixels of the defocus map 701 may not be the same. In the following description, for the purpose of convenience of explanation, it is assumed that the defocus map 701 is enlarged (or reduced) using an appropriate interpolation method and has the same number of pixels as the captured image 700. A distance map in which a distance value from the imaging device to a subject is stored for each pixel may be used instead of the defocus map 701. In the defocus map 701 illustrated in FIG. 7, an area with pixel values of 0 indicates an in-focus area, and an area with greater pixel values indicates an area farther from an in-focus position.

The area split unit 500 splits the defocus map 701 in FIG. 7 into an area 711 and an area 712 in S600 in FIG. 6. Here, an in-focus area 711 is supposed as an area to be detected (hereinafter referred to as a detection area). An image 702 in FIG. 7 is an image obtained by cutting out only an area corresponding to the detection area 711 from the captured image 700, and an edge which has not been present in the original captured image 700 is generated in the vicinity of the subject 710. Therefore, in this embodiment, a process of cutting out an area 713 including the detection area 711 is performed on the captured image 700 as indicated as an image 703. It is possible to curb generation of an edge by performing the low-pass filtering process on the vicinity of the boundary of the area 713. A process routine will be described below with reference to FIG. 8.

In S800, the area split unit 500 determines a detection area. FIG. 7 illustrates an example in which the number of detection areas 711 is one, but a plurality of detection areas 711 may be present. In this case, the process routine illustrated in FIG. 8 is performed on the respective detection areas. For example, clustering of defocus values may be performed and clusters corresponding to the defocus values can be sequentially set as the detection areas.

In S801, a process of cutting out an area 713 from the image 700 such that the detection area 711 is included therein is performed. An image acquired as a result of the process is defined as an image 703 (FIG. 7). Hereinafter, an area obtained by excluding the detection area 711 from the cut-out area 713 is referred to as a margin area. The size of the margin area is determined based on a receptive field of a CNN or whether there is occlusion with another subject. The receptive field of the CNN represents a range in which a detector holds pixel values. It is preferable that the range in which the information of the subject 710 is not held do not include an edge generated by the cutting. Therefore, a method of setting a width of the margin area to be proportional to the size of the receptive field is used. When another subject overlaps the detection area 711 and the margin area is taken smaller, there is a likelihood that a defect will be generated in the subject and accuracy will decrease. Therefore, when occlusion occurs in the detection area 711, setting is performed such that the width of the margin area is taken larger.

In S802, the pixel value adjusting unit 501 applies a low-pass filter to a pixel of interest in the margin area. Accordingly, it is possible to blur the margin area while maintaining the pixel values of the detection area 711 and to curb occurrence of an unnatural edge. The number of tapping positions of the low-pass filter may change depending on a distance from the boundary of the detection area 711 on the image. A process of determining whether to apply the low-pass filter may be performed based on whether the distance from the boundary of the detection area 711 on the image is greater than a predetermined threshold value. The boundary of the detection area 711 can be calculated by extracting an edge after area split. The reason the number of tapping positions or whether to perform a filtering process is changed based on the distance from the boundary of the detection area 711 is that there is a high likelihood that a pixel constituting a subject will be erroneously classified in the margin area due to an error of the defocus value in the vicinity of the boundary of the detection area 711. Accordingly, it is preferable that the number of tapping positions of a filter be decreased or a filtering process not be performed in the vicinity of the boundary of the detection area 711. As described above, by changing the number of tapping positions or whether to perform a filtering process based on a distance from the boundary of the detection area 711, it is possible to smooth pixel values of the other area while maintaining the pixel values of the subject to be detected.

The number of tapping positions of the low-pass filter may be determined based on a difference between an average value of the defocus values of the detection area 711 and an average value of the defocus values near a pixel of interest. As described above, this is because there is a likelihood that a pixel constituting the subject will be erroneously classified in the margin area due to an error of the defocus values. Here, it is assumed that a low-pass filter with the number of tapping positions equal to or greater than a predetermined value is applied to the vicinity of the boundary of the cut-out area 713 in order to curb generation of an edge.

In S803, a process of determining whether the pixel value adjusting unit 501 has processed all the pixel values in the margin area is performed. When it is determined that the pixel value adjusting unit 501 has processed all the pixel values in the margin area, a series of processes ends. When it is determined that the pixel value adjusting unit 501 has not processed all the pixel values in the margin area, the process routine proceeds to the process of S804. A process of updating a pixel of interest (a process of changing a position of the pixel of interest) is performed in S804 and then the process routine returns to the process of S802.

An example in which the low-pass filter is applied in S601 in FIG. 6 is described above. The present disclosure is not limited to this example, but a process of multiplying the pixel values by a weighting factor based on the distance from the boundary of the detection area 711 and gradually decreasing the pixel values may be performed. In this case, for example, an area 712 obtained by excluding the detection area 711 from the image of the subject 710 is set as the margin area. A process of multiplying all the pixels in an area corresponding to the margin area (the area 712) in the image 700 by a weighting factor (referred to by w) defined in the following expression is performed.

$$w = \exp\left(\frac{-(x-x_b)^2 - (y-y_b)^2}{M}\right) \quad \text{(Expression 1)}$$

In Expression 1, (x, y) denotes coordinates of a pixel of interest in the margin area. ($x_b$, $y_b$) denotes coordinates a pixel closest to (x, y) in the detection area 711. M is a constant and can be set, for example, to M=10 [pixels]. Here, exp( ) denotes an exponential function.

This method is only an example and another method may be used as long as it is a method that can curb generation of an unnatural edge due to cutting-out of an area while pixel values in an area to be detected are maintained.

According to this embodiment, since an influence of an edge generated due to cutting can be reduced at the time of defining an area in which a subject is present, it is possible to reduce an influence of a subject other than a detection target or a texture pattern of the background and to improve detection performance.

Fifth Embodiment

A fifth embodiment of the present disclosure will be described below with reference to FIG. 9. The operation at the time of inference has been described above in the fourth embodiment, but an example in which the same process as in the fourth embodiment is performed on an image at the time of machine learning will be described in this embodiment. Since characteristics of an image can be matched between learning and inference, it is possible to further improve accuracy of a detector. Since profile information of a subject is also learned together, it is possible to distinguish a recognition object appearing in a picture or a photo from an actual recognition object.

Figure 8:
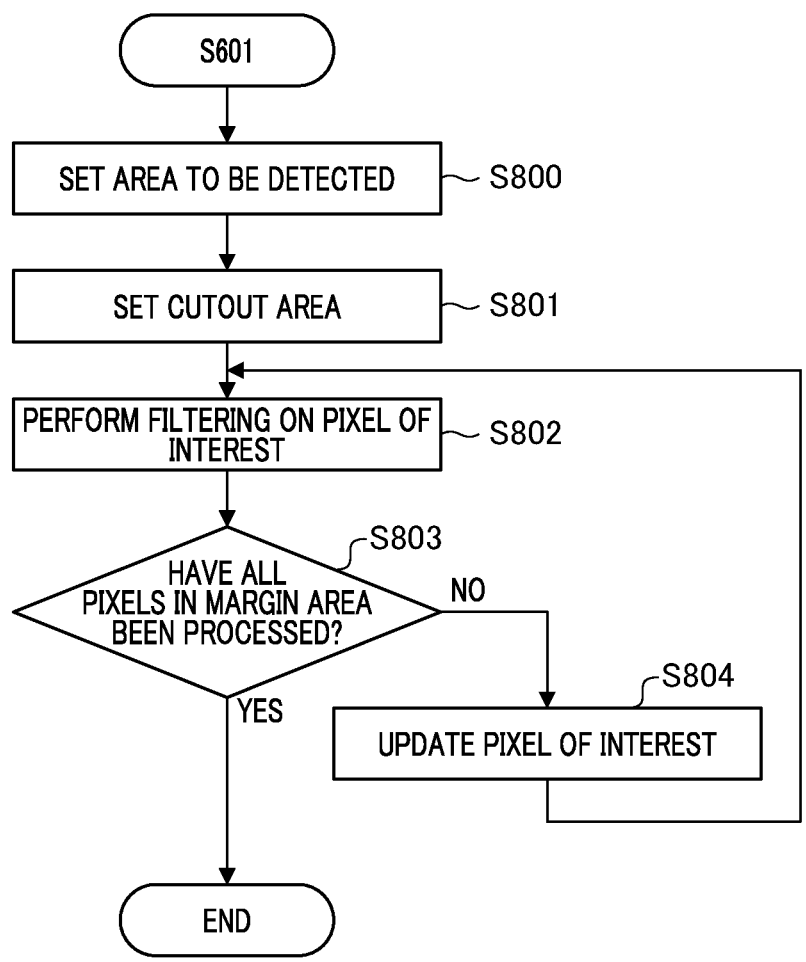
FIG. 8 is a flowchart illustrating a process routine which is performed by a pixel value adjusting unit 501.

Specifically, a process of acquiring a learning image is performed by performing the process routines illustrated in FIGS. 7 and 8. Characteristics of a learning image can be made uniform even when a subject is cut off using the defocus map at the time of inference without using the method according to this embodiment, but there is a high likelihood that accuracy will decrease when occlusion occurs in the subject. The reason will be described below with reference to FIG. 9.

Figure 9:
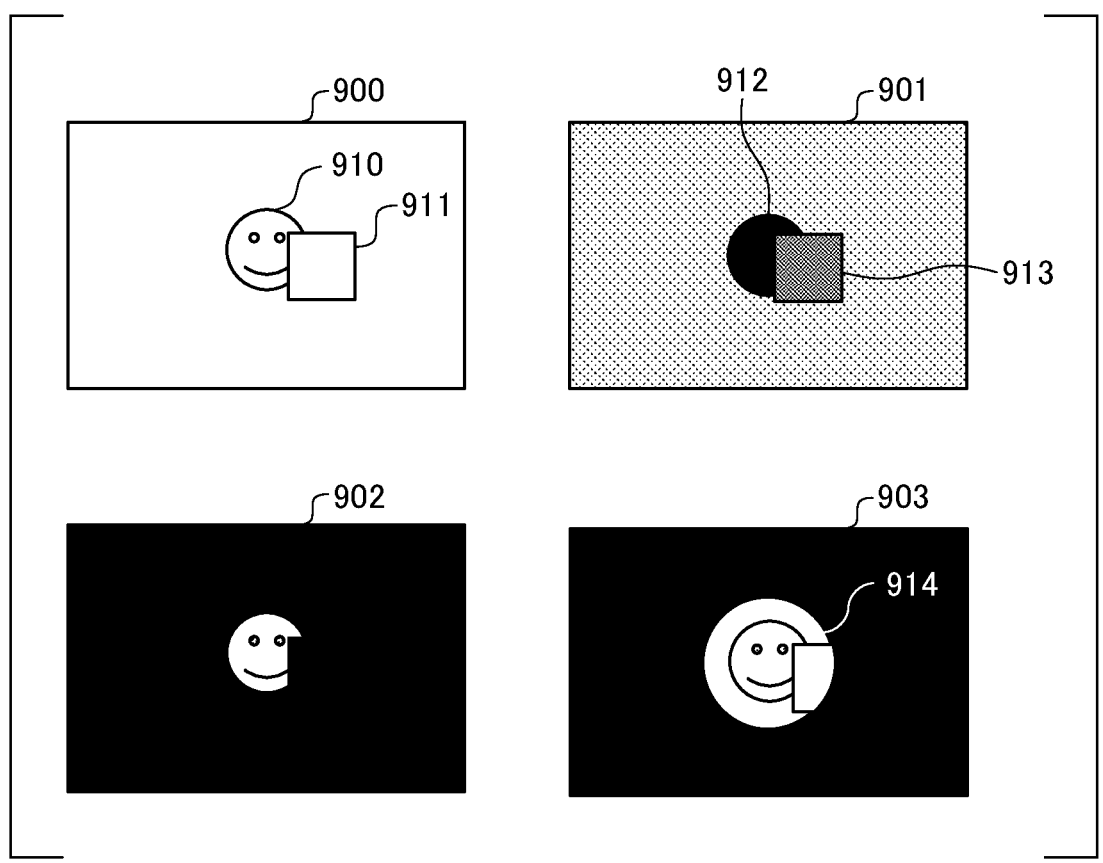
FIG. 9 is a conceptual diagram illustrating advantages in a fifth embodiment.

FIG. 9 is a diagram schematically illustrating a captured image 900, a defocus map 901, a cut-out image 902, and a machine-learning image 903. Images of subjects 910 and 911 appearing in the captured image 900 are also illustrated. Since the subject 911 is present on a shallow side (a camera side), occlusion occurs in a part of the subject 910. In the defocus map 901 in which a defocus value is stored for each pixel, areas 912 and 913 correspond to the images of the subjects 910 and 911. The areas 912 and 913 represent results of area splitting of the defocus map 901.

The image 902 is a result obtained by cutting out the area 912 and a loss occurs in a part of a profile of the subject. When an area corresponding to the subject 910 is simply cut out as in the image 902, machine learning is performed by combining an image in which a loss has occurred in the profile of the subject to be detected and an image in which no loss has occurred. Accordingly, there is a likelihood that detection accuracy will be caused. On the other hand, in this embodiment, a process of applying a low-pass filter to an area other than the subject in an area 914 including the image of the subject 910 as in the image 903 is performed. Accordingly, no loss is generated in the profile of the subject and it is possible to acquire an image close to a normal image and to perform machine learning thereon.

According to this embodiment, by matching characteristics of an image between learning and inference, it is possible to further improve detection performance in comparison with the fourth embodiment.

Sixth Embodiment

A sixth embodiment of the present disclosure will be described below. In this embodiment, an example in which the process routines according to the first to third embodiments and the process routine according to the fourth embodiment are simultaneously performed is described. A first threshold value for the area of a background area in an image is defined as Th1 and a second threshold value for the total area of an area other than the background is defined as Th2. A third threshold value Th3 for the number of divided areas other than the background is defined as Th3.

A process routine according to this embodiment will be described below with reference to FIGS. 2 and 6. The filtering process of S205 in FIG. 2 is performed when the area of a background area in an image is equal to or greater than the threshold value Th1, and the process of S205 is skipped when the area is less than the threshold value Th1. When the total area of areas other than the background is equal to or greater than the threshold value Th2 or the number of divided areas other than the background is equal to or greater than the threshold value Th3, the process of S601 in FIG. 6 is performed. When the total area of areas other than the background is less than the threshold value Th2 and the number of divided areas other than the background is less than the threshold value Th3, the process of S601 is skipped. Accordingly, it is possible to achieve an increase in processing speed and an increase in detection performance together.

Other Embodiments

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-001324, filed Jan. 7, 2021, No. 2021-077028, filed Apr. 30, 2021, which are hereby incorporated by reference wherein in their entirety.

What is claimed is:

1. An image processing device comprising:
a memory storing instructions; and
a processor executing the instructions causing the image processing device to:
acquire an image captured by an imaging element;
detect a subject from the acquired image; and
determine a subject detection result and perform control such that frequency components of an overall or partial area of the image are adjusted,
wherein the processor detects a subject from an image in which the frequency components have been adjusted; and
wherein the processor performs control such that the frequency components are adjusted by a weighting value by performing a filtering process.

2. The image processing device according to claim 1, wherein the processor determines a method of adjusting the frequency components and performs control such that accuracy of detection of a subject by the detection unit is enhanced.

3. The image processing device according to claim 1, wherein the processor determines a background area for the subject and performs control such that a high-frequency component of the background area is decreased.

4. The image processing device according to claim 1, wherein the processor performs control such that the frequency components are adjusted by adjusting a value of an aperture.

5. The image processing device according to claim 1, wherein the processor performs control such that the frequency components are adjusted through control of a focusing lens.

6. The image processing device according to claim 1, wherein the processor changes an aperture value when a reliability level of the subject detection result is less than a threshold value, and detects a subject from the acquired image.

7. The image processing device according to claim 1, wherein the control unit changes an aperture value when a distance difference in a depth direction in the captured image is equal to or greater than a threshold value, and detects a subject from the acquired image.

8. The image processing device according to claim 1, wherein the processor acquires a first image which is used for image processing and a second image which is used for recording, and
wherein the processor sets an aperture value to a first value when the first image is acquired and sets the aperture value to a second value when the second image is acquired.

9. The image processing device according to claim 1, wherein the processor calculates a difference in reliability between detection results of a subject from a plurality of consecutive frames and performs control such that an aperture value is decreased when it is determined that the difference is equal to or greater than a threshold value.

10. The image processing device according to claim 1, wherein the processor further executes an instruction causing the image processing device to calculate information of a defocus value, a depth, or a distance of a subject in a captured image,
wherein the processor performs control such that the frequency components are adjusted using the calculated information.

11. The image processing device according to claim 10, wherein the processor further executes an instruction causing the image processing device to extract an area of the subject based on the information of a defocus value, a depth, or a distance,
wherein the processor performs control such that the frequency components are adjusted on a part of an area including the area of the subject.

12. The image processing device according to claim 1, wherein the processor uses a convolutional neural network to detect the subject.

13. The image processing device according to claim 11, wherein the processor determines a size of the area including the area of the subject based on a receptive field of a convolutional neural network used for subject detection or whether there is occlusion with another subject.

14. The image processing device according to claim 12, wherein the processor performs machine learning using an image in which the frequency components have been adjusted.

15. The image processing device according to claim 11, wherein the processor changes a process of adjusting the image by comparing one or more of an area of a background area in an image, a total area of areas other than the background area, and an area division number for an area other than the background area with a threshold value.

16. An imaging device comprising:
an imaging element;
a memory storing instructions; and
a processor executing the instructions causing the image processing device to:
acquire an image captured by an imaging element;
detect a subject from the acquired image; and
determine a subject detection result and perform control such that frequency components of an overall or partial area of the image are adjusted,
wherein the processor detects a subject from an image in which the frequency components have been adjusted; and
wherein the processor performs control such that the frequency components are adjusted by a weighting value by performing a filtering process.

17. An image processing method that is performed by an image processing device capable of detecting a subject, the image processing method comprising:
acquiring an image captured by an imaging element;
detecting a subject from the acquired image;
determining a subject detection result and performing control such that frequency components of an overall or partial area of the image are adjusted; and
detecting a subject from an image in which the frequency components have been adjusted,
wherein performing control such that the frequency components are adjusted by a weighting value by performing a filtering process.

18. A non-transitory recording medium storing a control program of an image processing device causing a computer to perform each step of a control method of the image processing device, the method comprising:
acquiring an image captured by an imaging element;
detecting a subject from the acquired image;
determining a subject detection result and performing control such that frequency components of an overall or partial area of the image are adjusted; and
detecting a subject from an image in which the frequency components values have been adjusted,
wherein performing control such that the frequency components are adjusted by a weighing value by performing a filtering process.

* * * * *